US006778495B1

(12) United States Patent
Blair

(10) Patent No.: US 6,778,495 B1
(45) Date of Patent: Aug. 17, 2004

(54) COMBINING MULTILINK AND IP PER-DESTINATION LOAD BALANCING OVER A MULTILINK BUNDLE

(75) Inventor: Dana Blair, Alpharetta, GA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/574,684

(22) Filed: May 17, 2000

(51) Int. Cl.$^7$ ........................ H04L 12/26; H04L 12/28
(52) U.S. Cl. .................................. 370/230; 370/395.32
(58) Field of Search .................................. 370/230, 231, 370/235, 395.32, 395.4, 395.41, 395.42, 395.21, 471, 474

(56) References Cited

U.S. PATENT DOCUMENTS

| 6,157,649 A | * | 12/2000 | Peirce et al. ................. 370/401 |
| 6,185,208 B1 | * | 2/2001 | Liao ............................ 370/392 |
| 6,226,267 B1 | * | 5/2001 | Spinney et al. ............. 370/235 |
| 6,385,209 B1 | * | 5/2002 | Skirmont et al. ........... 370/419 |
| 6,515,963 B1 | * | 2/2003 | Bechtolsheim et al. ..... 370/229 |
| 6,563,821 B1 | * | 5/2003 | Hong et al. ................. 370/389 |
| 6,577,596 B1 | * | 6/2003 | Olsson et al. ............... 370/230 |

OTHER PUBLICATIONS

"Configuring Media–Independent PPP & Multilink PPP" dated Nov. 4, 1999 (pp. 1–24).
Shiva Access Port, "Introduction to PPP Multilink" dated Nov. 3, 1999 (pp. 1–2).
RFC 1990 "The PPP Multilink Protocol (MP)" dated Nov. 3, 1999 (pp. 1–20).
Internet FRC/STD/FYI/BCP Archives, RFC1717, "The PPP Multilink Protocol (MP)" dated Nov. 3, 1999 (pp. 1–14).
RFC1934, "Ascend's Multilink Protocol Plus (MP+)" dated Nov. 3, 1999 (pp. 1–39).

* cited by examiner

Primary Examiner—Alpus H. Hsu
Assistant Examiner—Toan Nguyen
(74) Attorney, Agent, or Firm—Hickman Palermo Troung & Becker LLP

(57) ABSTRACT

Load balanced transport of best efforts traffic together with delay-bounded traffic over a multilink bundle combines fragmentation and fragment distribution for best efforts packets with per-flow balancing for delay-bounded traffic. In the preferred embodiments, the best efforts packets receive Multilink Protocol treatment, including fragmentation and addition of sequence headers. Fragments of packets for one such communication go over the various links within the bundle, as appropriate for load balancing on the links. For each delay-bounded flow, such as for a VOIP service, the sending node hashes the packet header data and applies all packets for the flow to one of the links, assigned as a function of the hash value. Different flow headers produce different hash results; therefore the node sends different flows over the different links in a substantially balanced manner.

32 Claims, 3 Drawing Sheets

COMBINING MULTILINK AND IP PER-DESTINATION LOAD BALANCING OVER A MULTILINK BUNDLE

FIELD OF THE INVENTION

The present invention relates to techniques for balancing packet data communications over multiple links in a bundle forming a unified interface between two nodes of a data network, particularly where some packets relate to delay-bounded communications and other packets relate to a different class of traffic.

BACKGROUND

Digital data communication is fast becoming a ubiquitous aspect of modern life. The performance of devices relying on such communications continually improves at an ever-increasing pace. As a result, there is an ever-increasing demand for communications services and an attendant increase in the bandwidth that the data communications facilities must provide.

Modern data communications utilize a variety of different forms of packet communications. Within a packet network, many of the links are point-to-point links between peer nodes. When a need for increased bandwidth on such a link arises, one option is to replace the existing link with a higher bandwidth link. However, this approach often is prohibitively expensive, particularly as an incremental upgrade. Accordingly, the solution to providing increased bandwidth often entails deploying one or more new links of similar or somewhat higher capacity in parallel to the existing link between the nodes forming the two end points. Such an upgrade forms a multilink bundle, with an aggregate bandwidth that is essentially the sum of the bandwidths or throughput rates of the parallel links in the bundle.

The multilink bundle does offer increased capacity, however, its use presents certain problems. To effectively utilize the links in the bundle as an aggregate requires that the bundle effectively appear as a single interface to each end-point node. At one logical level, all traffic intended for transport through this interface must appear as a single, unified data stream. However, within the bundle, it is necessary to segregate the traffic and distribute segments of traffic to the different links.

To maximize utilization of the parallel links within a multilink bundle, the packet communication load on the two or more parallel links must be "balanced," that is to say the volume of packet data traffic through the bundle must be optimally distributed between the various parallel links. A number of known algorithms are used to select which link to use to transport the various packets between the end-points and thereby balance the load on the links.

One type of approach manages the packet routing over the links based on link utilization. For example, when traffic on a first link reaches a certain level, the sending node shifts further packet traffic over to the next parallel link. This approach tends to load one link first, then another, and so on. Another general class of load-balancing techniques evenly distributes packets across all the links regardless of the current level of utilization of any particular link. This later approach reduces packet latency. Within this class, there are a number of specific approaches to load balancing.

One approach comprises Internet Protocol (IP) flow-based balancing. A flow is a unique conversation between two terminations on the data network. Flow-based balancing assigns each flow to one link. Once a flow is designated to use a particular link, it always goes over that link. A new flow may go over another link.

With most implementations of the flow-based balancing technique, a router or the like looks at the header of each packet and hashes all or part of the header. The IP flow-based balancing algorithms may hash different amounts of information from the header. Typically, the algorithms form a hash from the source address, the source port, the destination address and the destination port, i.e. the data from the header that uniquely defines a particular flow.

The router sends all packets with the same hash code over the same link in the bundle. The packets with the same header information produce the same hash code, and the router always assigns the packets with that hash to use the same link. Packets for communications having different headers, for example for a new session between a different source and destination, receive a different hash and may go over a different link in the point-to-point bundle. However, all packets in any one flow traverse only one link, in exactly the order received by the router. There is no need to add a sequence header or rearrange packets to compensate for different transit times over different links.

Flow-based balancing distributes flows over multiple links. However, no one flow can use all the bandwidth of all the links. If a single flow were to use more than one link, the packets may get reordered because of different packet lengths or different link latencies. There is nothing in the IP link layer to correct the order. TCP will recover packet order. However, reordering increases delays and reduces throughput. For example, it may drop a frame and request a retransmission. Hence, each flow must use a single link within the bundle. Consequently, one flow at most can access the maximum bandwidth of the largest of the channels or links within the bundle.

Many point-to-point links today use PPP, the Point-to-Point Protocol. The Multilink Protocol (RFC 1717) is a standardized extension of the PPP, which enables combination of PPP links or channels into a 'Multilink bundle' for higher rate point-to-point communications. The Multilink Protocol (MLP) uses packet fragmentation and a round-robin link assignment technique to distribute portions of data traffic over the various links within a bundle.

A typical load-balancing situation using the Multilink Protocol involves a point-to-point bundle of links between two peers, for example, between two routers. A common implementation may use multiple ISDN links between the nodes, for example basic rate or primary rate (T1) ISDN connections.

A router at one end of the bundle separates a long IP packet into two or more fragments and adds an MLP sequence header to each fragment. The load-balancing algorithm distributes the fragments taken from each packet over an appropriate number of the links, to allow parallel transmission through the bundle. In this manner, packets from a particular flow actually utilize any or all of the links in the bundle.

The communications over parallel links may encounter different delays in transmission. Fragments of one packet or succeeding packets may arrive at the receiver in a different order than when sent out over the multilink bundle. The PPP Multilink Protocol therefore uses packet sequencing to order fragments and packets. Specifically, a sequence number included in the header of each fragment of a packet allows the receiver to properly reorder the fragments and packets as they arrive over different links in the bundle.

The use of the sequence numbers, the differences in transit time through the links and the subsequent reordering all add delay and processing time. A goal is to make the bundle appear as a single point-to-point interface. In this regard it would be preferable to avoid reordering if possible.

The Multilink Protocol also provides for transport of two classes of packets, packets with sequence numbers and packets without sequence numbers. It is possible to expedite communication of a packet through the bundle by omitting the sequence number.

Using this class distinction under PPP, it becomes possible to interleave delay-sensitive traffic with packet fragments of other traffic. If the sending router receives a delay-sensitive packet, such as a voice over IP (VOIP) packet, the router can insert that packet (or fragments thereof) between the fragments of larger packets, that is to say by interleaving the delay sensitive packets between the fragments of the other packets. The delay-sensitive packet or its fragments do not receive sequence numbers. The interleaving approach works on a single point-point-point link, e.g. a single T1. However, because there is no sequence number, there is no way to handle the delay-bounded traffic over different links in a multilink bundle. The existing systems therefore have not been able to combine the fragmentation and attendant load balancing with transport of delay sensitive packets.

Per-flow load balancing techniques do not impose any additional delays due to differences in transit times through the multiple links or reorder processing caused by transport of packets of one flow over two or more links as in the Multilink fragmentation approach. However, existing per-flow balancing systems treat all traffic the same and impose the single link per flow limitation on all flows through the bundle.

Extensions to the Multilink Protocol RFC are in debate to add multiple sequence spaces to the multilink header sequence number. With these extensions, the bounded delay packets could be distributed over any link in the bundle because the receiver will guarantee that packets are received in the order sent. This proposed solution has a problem for bounded delay packets which may have fragments sent across more than one link in the bundle where the links have a large differential delay. Multilink bundles over high-speed links must be designed with 50–250 ms of differential delay because the links may traverse different geographies. Any bounded delay packets with fragments sent over these links would incur additional latency due to the differential delay.

A need therefore exists for systems and methodologies to allow transport of two or more classes of traffic through a multilink bundle, with appropriate treatments for optimal load balancing. Delay sensitive traffic should be distributed evenly over all links in the bundle, however, the system and methodologies must minimize delays and differences in delays imposed on communication of delay sensitive or delay-bounded traffic. Traffic that is not delay sensitive should be distributed evenly and in such a manner as to enable any particular communication or flow to utilize any or all of the available links, however, the combined load balancing technique should enable interleaving of the delay sensitive traffic as part of the efforts to minimize delays for such traffic.

DISCLOSURE OF THE INVENTION

The invention addresses the above stated needs and overcomes the stated problems by combining the multilink flow balancing technique with the per-flow balancing technique within one bundle.

One inventive aspect relates to a method of load balanced communication of packets through a bundle of data communication links between two nodes of a packet communication network. The method involves distinguishing packets for best-efforts service from packets forming delay-sensitive flows. For best-efforts service, packets are fragmented, and in preferred embodiments, headers with sequence numbers are added to the fragments. For each fragmented packet, the method entails transmitting the fragments over two or more of the links of the bundle. For a first delay-sensitive flow, the sending device calculates a first hash value from predetermined packet header data, in each packet of the flow. Similarly, the device calculates a second hash value for packets of another delay-sensitive flow. The hash values differ. Each packet for the first delay-sensitive flow is assigned to a first one of the links as a function of the first hash value, whereas each packet for the second delay-sensitive flow is assigned to a second one of the links as a function of the second hash value. The inventive method transmits packets of the first and second delay-sensitive flows over the assigned links interleaved together with the fragments transmitted on those links.

In preferred systems, such as routers or the like that implement the invention, packets for which best efforts delivery is sufficient receive Multilink Protocol treatment, that is to say with fragmentation and addition of sequence headers. Fragments of packets for any best efforts communication go over the various links within the bundle, as appropriate for load balancing on the links. For each flow of delay-bounded data, such as VOIP packets, the sending device hashes the header data and applies all packets for the flow to one of the links, assigned as a function of the hash value, for example, in standard Point-to-Point Protocol format. Different flow headers produce different hash results; therefore the device sends different delay bounded flows over the different links. Each delay-bounded flow utilizes only one of the links. Delay-bounded traffic for multiple flows utilizes all of the links in a substantially balanced manner.

An advantage of this invention is that the bounded-delay packets can be distributed over all of the links in a multilink bundle, without the risk of packet reordering or the need for sequence numbers. Packets for which 'best-efforts' service is sufficient, however, still receive the normal Multilink Protocol load-balancing treatment.

Another advantage of this invention is that it prevents differential delay between bundle links from contributing to the overall delay of bounded-delay packets. Sending all of the packets for one flow over one link, corresponding to the hash of the header information, eliminates all such differential delay problems. The relatively random selection of the link for each flow based on each new hash of a new flow header, however, balances the load of such packets produced by many such flows over all of the links within the one bundle.

Other inventive aspects relate to sending devices and receiving devices, using the inventive technique for load balanced communication of two classes of traffic through a multilink bundle. For example, one aspect relates to a device for reception of load balanced packet transmissions through a bundle of data communication links. The bundle carries fragments of packets of best efforts traffic distributed throughout the links, and the bundle carries packets for delay-sensitive flows. The packets of each delay-sensitive flow traverse a single one of the data communication links. The receiving device includes link interfaces, each of which is coupled for reception of fragments and packets over one of the data communication links. A decoder, coupled to the link interfaces, segregates the received fragments from the received packets for the delay-sensitive flows. A fragment reassembler reorders fragments received over different links as necessary and reassembles fragments into packets, for the best-efforts service. A packet router receives the reassembled packets, and this router receives delay-sensitive packets carried by a plurality of the links from the decoder without any reordering.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The invention involves a combination of multilink processing for one class of traffic and per-flow load balancing for another class of traffic that is sensitive to delay. This particular combination allows a multilink bundle to efficiently carry different classes of traffic with an optimum load balance. The processing of the delay sensitive traffic, however, keeps packets for any one such flow going over one link in the bundle, and thereby avoids problems and/or delays due to ordering or reordering received packets and differential delays incurred by transit over more than one link.

Figure 1:
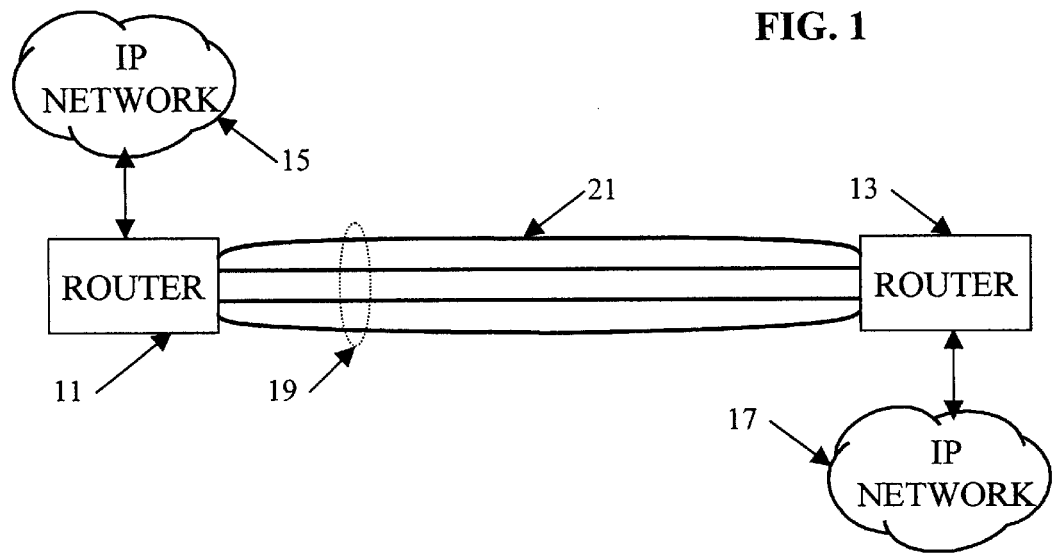
FIG. 1 is block diagram of a segment of a network, including a multilink bundle, on which the traffic may be balanced in accord with an embodiment of the invention.

It may be helpful at this point to consider a typical implementation of a multilink bundle. As shown in the example of FIG. 1, a first router 11 conducts peer-to-peer communications with a second router 13. Each router 11, 13 provides two-way IP packet communication services for one or more devices (not shown) that are coupled to the respective router through some form of IP network, shown generically as clouds 15, 17. Although other protocols may be used, in the preferred embodiment, the routers utilize point to point protocol (PPP) to transport IP packets over a bundle 19 comprising two or more parallel links or channels 21.

The links 21 in the bundle 19 may be physical links of the same or different bandwidth extending in parallel between the two peers, in the example between the two routers 11, 13. For example, a bundle of four links may include four primary rate interface (PRI) ISDN links or the equivalent four T1 lines. Alternatively, two or more of the links 21 may be logical channels carried over the same physical link, such as two B-channels of a basic rate interface (BRI) ISDN line.

The routers utilize the Multilink Protocol for PPP to aggregate the bandwidth of the individual links 21 so that the bundle appears as a unified logical interface for IP communications between the routers 11, 13. In accord with the invention, the router processing for communication over this bundle 19 takes maximum advantage of the fragmentation and interleaving capabilities of the Multilink Protocol.

Figure 2:
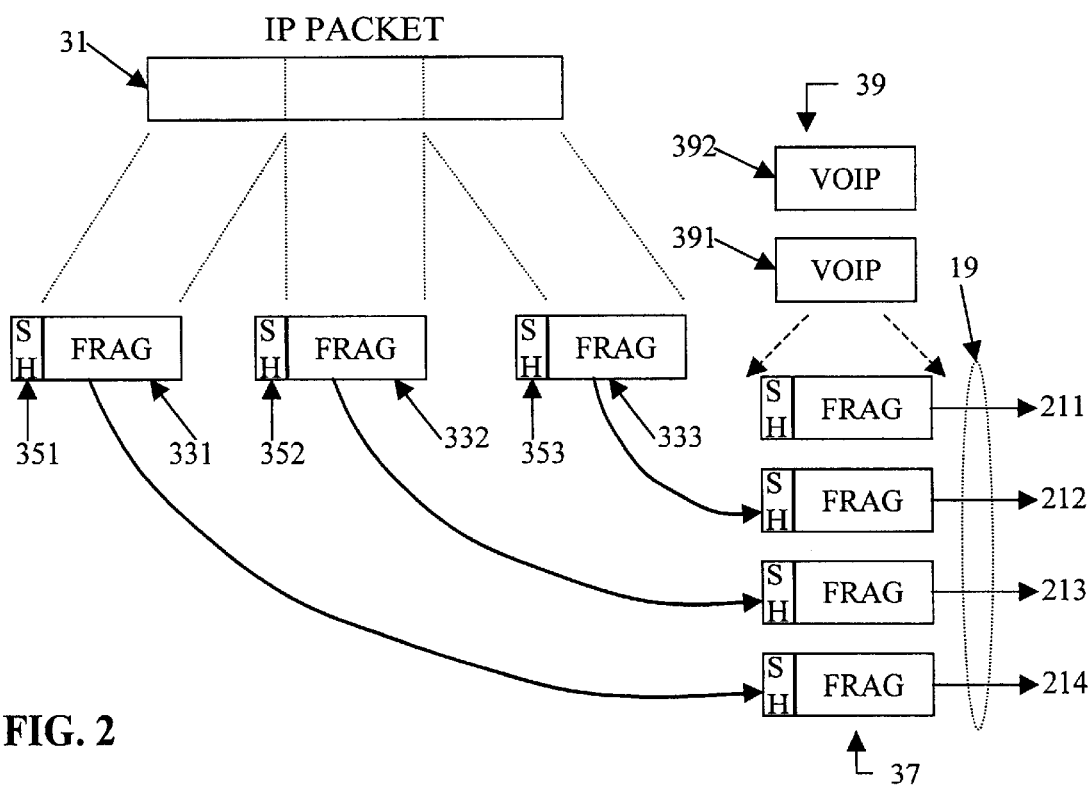
FIG. 2 is a flow diagram illustrating the processing of several packets, useful in explaining certain aspects of the invention.

In the Multilink Protocol, large packets are broken up into multiple segments or "fragments" sized appropriately for the multiple physical links. To illustrate this point, FIG. 2 shows a large IP packet 31. For purposes of this discussion, assume that the packet 31 relates to a communication receiving best-efforts service from the routers 11, 13, for example for an FTP or HTTP transmission. The router 11 may receive the packet 31 from a device coupled to IP network 15. The packet includes a destination address associated with a device on IP network 17, and the router 11 must forward the packet over the bundle 19 to the router 13.

In this example, the router 11 breaks the large IP packet 31 into a series of fragments, shown for example as the three fragments 331, 332, 333. The fragments may have the same size if the links have similar bandwidths or bit-rates; or the fragments may be sized to correspond to differences in the capacities of the links. A Multilink PPP sequence header (SH) is inserted before each section. The first fragment of a multilink packet in PPP, for example, will have two headers, one for the fragment followed by the IP header for the packet itself. In the example, the sequence header 351 is added to the fragment 331, the sequence header 352 is added to the fragment 332, and the sequence header 353 is added to the fragment 333.

Each sequence header SH includes the Multilink Protocol Identifier. Typically, Multilink PPP fragments are encapsulated using the protocol identifier 0x00-0x3d. Following the protocol identifier, the sequence header includes the actual Multilink header, which is a four-byte header containing a sequence number, and two one bit fields indicating that the fragment begins a packet or terminates a packet. After negotiation of an additional PPP LCP option, a two-byte header with only a 12-bit sequence space may optionally replace the four-byte header.

The router queues the encapsulated fragments from the packet 31 with fragments 37 of preceding packets for transmission over the links in the bundle 19. In the example shown, the bundle 19 includes four links, 211, 212, 213, and 214. The router maintains a separate queue for each link, represented in the simplified example by one fragment 37. The router assigns each new fragment to one of the queues in such a manner as to distribute traffic over all of the links 21 in a balanced manner, typically using a round-robin assignment algorithm. In the example, the fragment 331 and its header 351 are queued-up for transmission over the link 214, the fragment 332 and its header 352 are queued-up for transmission over the link 213, and the fragment 331 and its header 353 are queued-up for transmission over the link 212. Since the packet 31 broke down into only three fragments, no fragment for that packet is queued for the link 211. Instead, the router would queue the first fragment of the next packet (not shown) for transmission over the fourth link.

The fragmentation allows parallel transmission of the segments of the large packets over any two or more of the parallel links. As such, a best effort communication may use any or all of the bandwidth of any or all of the links 21 in the bundle 19. The traffic load generated by such packets is evenly distributed over the links. If differential delays on the links cause fragments to arrive out of order, the receiver (in router 13 in this example) can utilize the sequence numbers to reorder the fragments as needed to reconstruct the original IP packet 31 before further transmission thereof over the IP network 17.

In accord with the invention, the routers 11, 13 also communicate packets relating to delay sensitive traffic. For such traffic, a maximum delay or boundary is usually defined as part of the negotiation to initiate communication. Hence, such traffic may be termed "delay-bounded." Voice telephone communication over an IP network (VOIP) is one example of a delay-bounded communication. Assume for discussion purposes that the router 11 receives a flow 39 of voice over IP packets, represented by packets 391, 392 in the drawing. The router recognizes that such packets relate to delay-bounded traffic.

PPP allows interleaving of delay-sensitive traffic with packet fragments of other traffic. When the sending router 11 receives a delay-sensitive packet, such as the first voice over IP (VOIP) packet 391, the router inserts that packet (or fragments thereof) between the fragments of larger packets, that is to say by interleaving the delay sensitive packets between the fragments of the other packets. The delay-sensitive packer or its fragments do not receive sequence numbers.

The router 11 transmits the packets for one delay sensitive flow 39 over only one link, using a hashing technique to select a link and maintain communication of the flow over the one link. In the example, the VOIP packets of the flow 39 utilize the link 211. The router 11 might interleave a first packet 391 before the illustrated fragment 37 and then interleave a second packet 392 after the illustrated fragment 37 for the link 211.

A different delay-bounded flow would similarly utilize only one link, but the assignment of that second flow would not necessarily be to the link 211. Instead, the router 11 assigns each new delay-bounded flow in accord with a load balancing algorithm based in part on a hash of certain header information from the IP packets of the flow.

As shown by the discussion of FIGS. 1 and 2, packets for best efforts delivery receive normal multilink treatment with fragmentation and addition of sequence headers. Fragments of such packets go over the various links within the bundle, as appropriate for load balancing on the links. For each flow 39 of delay-bounded data, however, the sending router 11 hashes the header data and applies all packets for the flow to one of the links, assigned as a function of the hash value. Different flow headers produce different hash results; therefore the router 11 transmits different delay bounded flows over different ones of the links. Although any one flow will utilize only one of the links, the delay-bounded traffic for multiple flows actually utilizes all of the links in a substantially balanced manner. The sending router may use a number of different algorithms to process the hash values so as to assign flows to the various links. Several examples are discussed in detail later.

The invention enables distribution of the bounded-delay packets, such as VOIP packets, over all of the links in a multilink bundle, without the risk of packet reordering or the need for sequence numbers. Packets for which 'best-efforts' service is sufficient, however, still receive the normal multilink load-balancing treatment. Another advantage of this invention is that it prevents differential delay between bundle links from contributing to the overall delay of bounded-delay packets. For example, consider a three-link bundle. Voice packets are fragmented into two multilink fragments. One of the links is delayed 50 ms from the other. It should be noted that many inverse multiplexer produces must handle much greater differential delays. Sending the voice-packet fragments using a pure round-robin technique would unnecessarily add 50 ms to the delay jitter of the voice packets. Sending all of the voice packets for one flow over one link, corresponding to the hash of the header information, eliminates this differential delay. The random selection of the link based on each new hash of a new flow header, however, balances the load of such packets produced by many such flows over all of the links within the one bundle.

Figure 3:
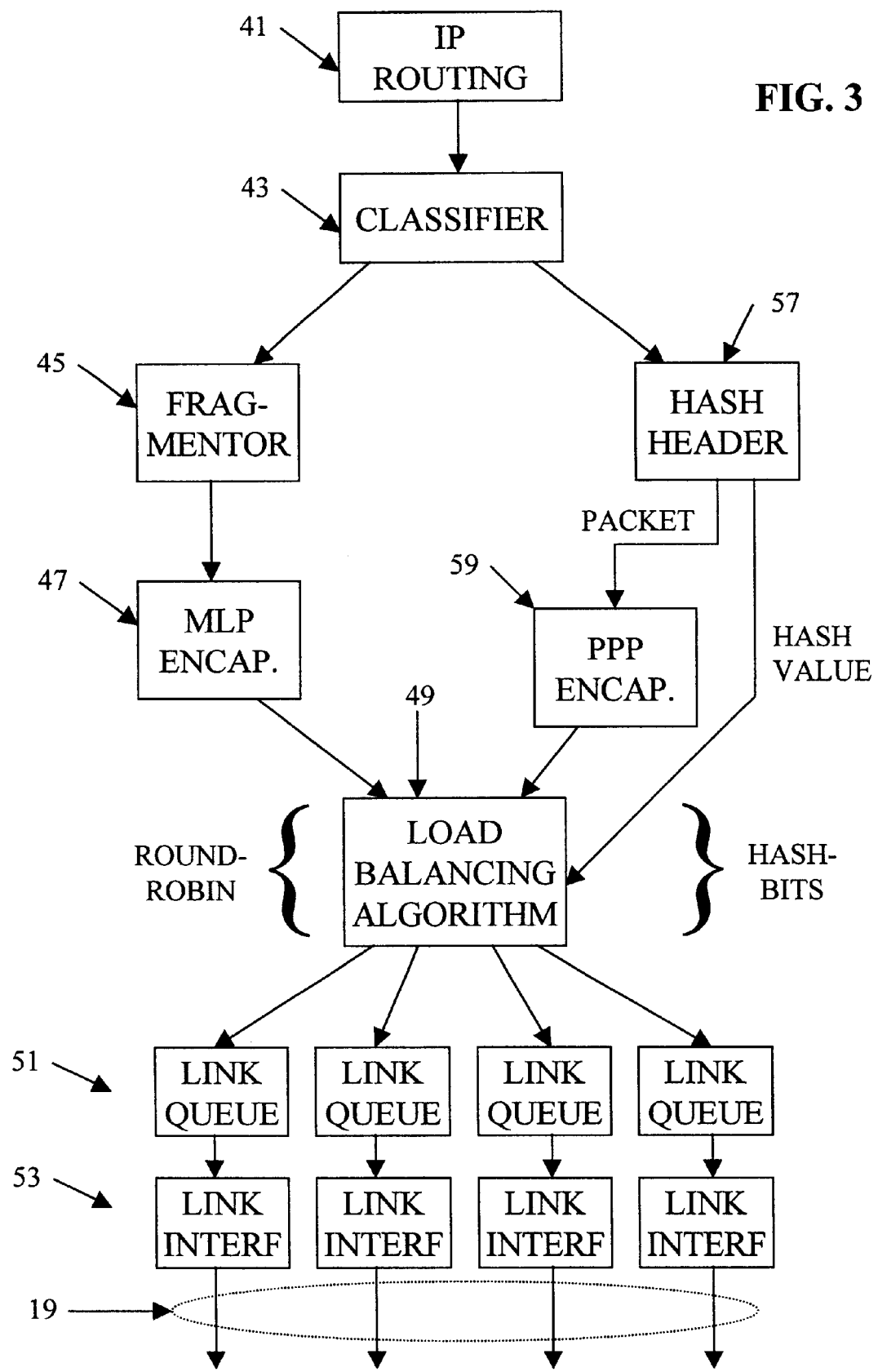
FIG. 3 is a block logic-diagram of software and/or hardware elements in a unit at one end of a multilink bundle, for sending packets in accord with an embodiment of the invention.

FIG. 3 is a block diagram of the logical processing elements within one of the routers, as it sends packets over the links of the bundle. The blocks illustrated in the drawing may be implemented with any appropriate combination of hardware and software.

The sending router includes one or more logical elements 41 for receiving IP packets from other network links and performing a routing function. When the IP packet processing indicates a need to transmit a packet via the bundle 19, the routing element 41 supplies the packet to an element or software code module for performing a classifier function shown at 43.

For purposes of the present invention, the classifier 43 distinguishes packets requiring delay-bounded service from other packets, which require only best efforts treatment. For this purpose, the classifier 43 looks at the IP packet header and examines certain configuration or provisioning information. If the IP header has certain parameters set, then the packet relates to a delay-bounded communication. If the IP packet header does not have those packets set, then the packet receives only best efforts treatment.

Packets classified for best-efforts treatment go to a fragmentor 45. The fragmentor 45 fragments packets larger than a predetermined size into smaller portions or fragments. The maximum fragment size essentially corresponds to the smallest bandwidth of any of the links in the bundle times the maximum delay for communication of a fragment over a link in the bundle. The fragmentor 45 supplies the fragments of each packet to an element 47, which performs the function of MLP (Multilink PPP) encapsulation. As part of this encapsulation, this element assigns a sequence number to each fragment and adds the sequence number header to each fragment, as outlined above relative to FIG. 2. The encapsulation at 47 may add other related information, such as CRC information.

The encapsulated fragments are then processed through a load-balancing algorithm by element 49. The load-balancing algorithm used by element 49 distributes the fragments to queues 51 for the various output interfaces 53 to the respective links. For purposes of the discussion here, the interfaces 53 actually transmit the encapsulated fragments over the individual links 21 in the bundle 19. In a typical operation, the load-balancing algorithm 49 supplies MLP encapsulated fragments to the queues 51 for the different link interfaces 53 in a round-robin fashion, although the algorithm may be weighted to allow for any differences in the bandwidths of the different links 21 in the bundle 19.

Packets classified for delay-bounded treatment go through a different process flow. The classifier 43 supplies each delay-bounded packet to an element or software operation 57 that performs a hash on certain data selected from the IP packet header. The hash operation 57 may utilize any or all of the data from the IP packet header. It is envisioned that practical embodiments of the hash operation will process at least the source information (IP address and port ID) or at least the destination information (IP address and port ID). The presently preferred embodiment performs the hash on the source and destination information.

The results of the hash operations for multiple bounded-delay data flows therefore vary in a substantially random manner based on the random information in the packet headers of the different flows. However, all of the packets for any one flow (from one source to one destination) will result in the same numeric value from the hashing of the common header information.

After the hash operation performed at 57, each packet goes to an element 59, which performs the function of PPP encapsulation. Unlike the MLP encapsulation, this operation does not entail addition of a sequence number in the header. The PPP encapsulated packet as well as the hash value is supplied to the load-balancing algorithm 49. In addition to the round-robin distribution of the fragments of the best-efforts packets, the software controlling the load-balancing 49 distributes the delay-bounded packets to the queues 51 for the various output interfaces 53 for the individual links 21 in the bundle 19. In accord with the invention, the load-balancing algorithm 49 supplies the delay-bounded packets to the queues 51 for the different link interfaces in accord with the hash values derived from the header information.

The distribution of the delay-bounded packets for multiple flows to the different queues 51 effectively interleaves those packets (without MLP sequence headers) in between fragments of best-efforts packets in the queues, in the manner discussed above relative to FIG. 2. The interleaving allows transmission with minimal delays. All packets for one delay-bounded flow result in the same hash value and go over the same link; therefore transmission of the flow does not result in any reordering or any differential delays. However, packets for another delay-bounded flow typically go to a different link associated with the different hash value, so that overall delay-bounded traffic is distributed through all the links and interleaved with the fragments on all of the links.

There are several approaches to distributing packets based on the hash bits. The router could use a look-up table essentially assigning all active hash values to individual link interface queues or any of a number of other assignment techniques. Another approach determines if the hash operation produces a new hash value, and if so, assigns the hash value (and thus the packet flow) to an available link. If the hash value is not new, it has previously been assigned to a link, and subsequent packets go to the assigned link. The assignment for a new hash value could use a round robin technique. Alternatively, the router could assign each new hash value to the least-used of the links. The least-used link could be identified based on the current level of overall traffic for the allowable bandwidth of each link, or this usage could be identified as a function of the level of assignment of bounded-delay flows to the respective links. With any such technique, the assignment preferably expires, for example if the hash value did not repeat within a predetermined time period.

Another approach calculates the hash, and then the hash value is reduced to a predetermined number of bits, for example by further hashing the first hash value to get a new hash of a size sufficient to uniquely identify one of the links from among the number of links in the bundle. The second hash is a programmable function of the first hash and the number of available links. The number of links may vary over time, for example as links are added or because links temporarily go out of service.

In its simplest form, the second function could use a number of least significant bits in the first hash to identify one of the links 21. For example, if there were two links, the least significant bit of an 8-bit hash would identify one of the two links. If there were four links, as shown, the two least significant bits of an 8-bit hash would identify one of the four links. For a large domain of header data, the distribution of least significant bit(s) from values produced by the hashing function should produce a relatively random distribution of link selections. In any such method of link assignment, a predetermined number of bits of the hash value directly identifies the ports or queues for the various links.

Figure 4:
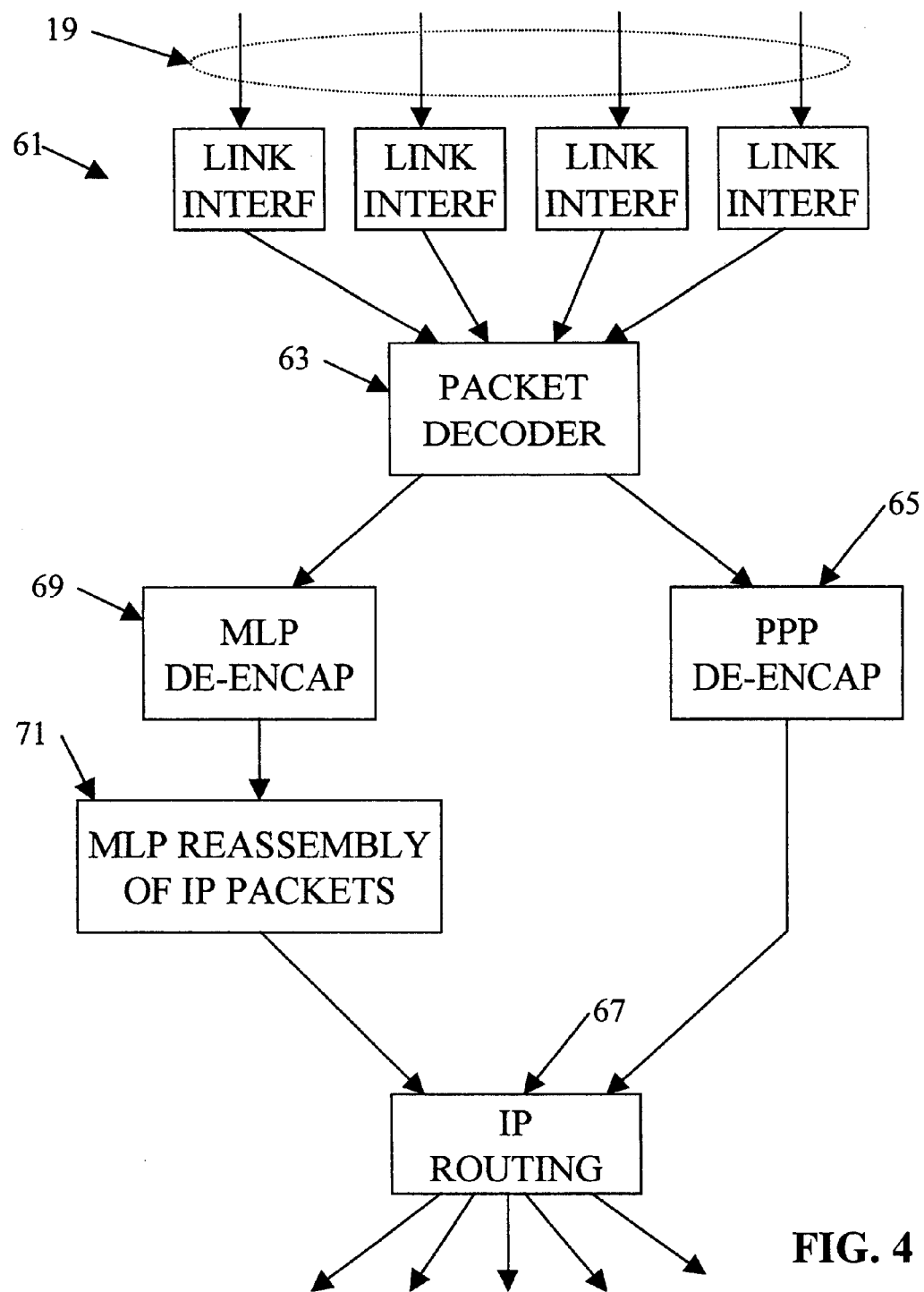
FIG. 4 is a block logic-diagram of software and/or hardware elements in a unit at another end of the multilink bundle, for receiving packets in accord with the embodiment of the invention.

The receiver and transmitter are active at the same time. FIG. 4 is a block diagram of the logical processing performed within one of the routers, as it receives packets over the links of the bundle 19. The blocks illustrated in the drawing may be implemented with any appropriate combination of hardware and software.

The receiving router includes multiple interfaces 61, to the various links of the bundle 19. Each interface 61 receives a series of packets and fragments from the transmitter interface in the router or other node associated with the opposite end of the multilink bundle.

The interfaces 61 supply the packets and fragments to a packet decoder 63. The decoder effectively de-interleaves the two different types of traffic from all of the links in the bundle. The decoder 63 looks at a portion of the header of each packet or fragment and distinguishes MLP fragments from PPP packets. In the receiver, the decoder 63 looks at the protocol ID in the header to distinguish between MLP and PPP packets or fragments. MLP is a subset of PPP. If the identifier identifies MLP, the packet goes to the MLP processing. All other packets go through the PPP processing.

The decoder 63 supplies the different types of data units to two different de-encapsulators, to strip off the header and framing bits. The PPP de-encapsulation at 65, for example, recovers the IP packets of the delay-bounded traffic and supplies those packets to a subsequent IP routing element 67. For multilink (MLP) packets, the fragments recovered by the de-encapsulator 69 go through a reassembly operation 71, to reconstruct the original IP packets from the fragments. In both cases, the IP packets go to the routing function 67, which in turn relays the packets over the next subsequent link in their respective paths. Essentially, the element 67 looks at the IP header information and switches each packet out an appropriate port interface.

The PPP packets receive separate processing from the MLP packets in the receiver, to eliminate any delay in processing during reordering after a multilink communication. In the processing illustrated in FIG. 3, the IP packets go directly from PPP de-encapsulation 65 to the routing function 67. These delay-bounded packets therefore do not require any sequence processing, since the packets of any particular flow utilize only one link within the bundle. Conversely, the MLP fragments receive normal Multilink Protocol processing in element 71, based on the sequence header information associated with the MLP fragments, to reorder and/or reconstruct packets or fragments as necessary to recover the original packet stream before further routing.

As shown by the above discussion, the new techniques here involve combination of flow balancing for delay-bounded traffic with load balancing, such as that used in Multilink Protocol, for best efforts packets. Both types of load balancing are combined to distribute traffic over the links within one bundle, in such a way that the delay-bounded traffic as well as the best efforts traffic may be evenly distributed over all of the links in the bundle. Delay-bounded traffic, however, keeps each flow on one assigned link, so that there is no need for reordering and there are no differential delays. The best efforts traffic for any particular communication may use bandwidth from any or all of the available links.

The above discussion focused on operations of one router as the sending unit and another router as the receiving unit. Those skilled in the art will recognize that the links typically are two-way links and that the routers actually perform both the sending and receiving functions in association with all of the links in the bundle. Also, the units have been described as routers, but those skilled in the art will recognize that one or both of the nodes at the ends of the bundle may be other types of packet network communication devices, such as network access servers, host computers, etc.

Those skilled in the art will recognize that the present invention admits a wide range of modifications, without departure from the inventive concepts. For example, the precise protocols utilized on the links of the bundle may vary. Also, the best efforts traffic may be subject to a number of different types of load balancing instead of the exemplary round-robin algorithm described above.

Embodiments may be implemented in the form of one or more computer programs that are executed by one or more computer systems or processors. In an embodiment, a computer system upon which an embodiment of the invention may be implemented includes a bus or other communication mechanism for communicating information, and a processor coupled with the bus for processing information. The computer system also includes a main memory, such as a random access memory (RAM) or other dynamic storage device, coupled to the bus for storing information and instructions to be executed by the processor. The main memory also may be used for storing temporary variables or other intermediate information during execution of instructions to be executed by the processor.

The computer system further includes a read only memory (ROM) or other static storage device coupled to bus for storing static information and instructions for processor. A storage device, such as a magnetic disk or optical disk, is provided and coupled to the bus for storing information and instructions.

The computer system may be coupled via the bus to a display, such as a cathode ray tube (CRT), for displaying information to a computer user. An input device, including alphanumeric and other keys, is coupled to the bus for communicating information and command selections to the processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

In implementations in which the computer system is a router, the foregoing user input and output elements may be omitted, or a terminal interface may be substituted.

The invention is related to the use of the computer system for load balanced transmission of packets through a bundle of data communication links. According to one embodiment of the invention, load balanced transmission of packets through a bundle of data communication links is provided by the computer system in response to the processor executing one or more sequences of one or more instructions contained in main memory. Such instructions may be read into main memory from another computer-readable medium, such as storage device. Execution of the sequences of instructions contained in main memory causes the processor to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory. Transmission media includes coaxial cables, copper wire and fiber optics, including the wires that comprise bus. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the bus. The bus carries the data to main memory, from which the processor retrieves and executes the instructions. The instructions received by main memory may optionally be stored on storage device either before or after execution by processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

The network link typically provides data communication through one or more networks to other data devices. For example, the network link may provide a connection through local network to a host computer or to data equipment operated by an Internet Service Provider (ISP). ISP in turn provides data communication services through the global packet data communication network now commonly referred to as the "Internet". The local network and the Internet both use electrical, electromagnetic or optical signals that carry digital data streams. The signals through the various networks and the signals on the network link and through communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, an ISP, the local network and the communication interface. In accordance with the invention, one such downloaded application provides for load balanced transmission of packets through a bundle of data communication links as described herein.

The received code may be executed by the processor as it is received, and/or stored in the storage device, or other non-volatile storage for later execution. In this manner, the computer system may obtain application code in the form of a carrier wave.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations that fall within the true scope of the invention.

What is claimed is:

1. A method of load balanced transmission of packets through a bundle of data communication links, the method comprising the steps of:
   distinguishing packets for best-efforts service from packets forming a plurality of delay-sensitive flows;
   fragmenting a plurality of the packets for best-efforts service;
   for each fragmented packet, transmitting the fragments over a plurality of the data communication links of the bundle;
   for each packet of a first one of the delay-sensitive flows, calculating a first hash value from predetermined packet header data;
   for each packet of a second one of the delay-sensitive flows, calculating a second hash value from predetermined packet header data, the second hash value differing from the first hash value;
   assigning each packet for the first delay-sensitive flow to a first one of the data communication links as a function of the first hash value;
   assigning each packet for the second delay-sensitive flow to a second one of the data communication links as a function of the second hash value; and
   transmitting packets of the first and second delay-sensitive flows over the assigned first and second data communication links interleaved together with the fragments transmitted on the first and second data communication links.

2. A method as in claim 1, wherein the assigning steps directly identify the first and second data communication links from one or more bits of the first and second hash values.

3. A method as in claim 1, wherein the assigning steps associate the first and second hash values with the first and second data communication links, respectively as a function of usage of the first and second data communication links.

4. A method as in claim 3, wherein the function of usage of the first and second data communication links comprises relative levels of existing assignments to the first and second data communication links.

5. A method as in claim 1, wherein the steps of fragmenting and transmitting of fragments conform to the Multilink Protocol.

6. A method as in claim 5, wherein the step of transmitting packets of the first and second delay-sensitive flows conforms to the Point-to-Point Protocol.

7. A method as in claim 1, further comprising assigning the fragments for transmission over the plurality of data communication links in a round-robin fashion.

8. A method as in claim 1, further comprising adding a sequence number to each of the fragments for transmission.

9. A method as in claim 8, wherein the step of transmitting of the packets of the first and second delay-sensitive flows comprises transmitting packets of the first and second delay-sensitive flows without adding any sequence numbers.

10. A transmitting device, for load balanced transmission of packets through a bundle of data communication links, comprising:
    a classifier receiving a stream of data packets intended for transport through the bundle for segregating received packets for best-efforts service from received packets forming a plurality of delay-sensitive flows;
    a fragmentor coupled to the classifier for fragmenting a plurality of the packets for best-efforts service;
    means for calculating a hash value from predetermined data from a header contained in each packet of the plurality of delay-sensitive flows;
    link interfaces, each link interface being coupled for transmission of fragments and packets over a data communication link of the bundle; and
    a load balancing element for:
    1) evenly distributing the fragments of each of the plurality of the packets for best-efforts service to a plurality of the link interfaces for transmission; and
    2) distributing the packets of different ones of the delay-sensitive flows to a plurality of the link interfaces for transmission while distributing all packets of each one of the delay-sensitive flows to a single one of the link interfaces for transmission, as a function of the hash values.

11. A device as in claim 10 comprising a packet router.

12. A device as in claim 10, further comprising:
    a Multilink Protocol encapsulator for encapsulating the fragments; and
    a Point-to-Point Protocol encapsulator for encapsulating the packets of the delay-sensitive flows.

13. A device as in claim 12, wherein:
    the Multilink Protocol encapsulator adds a header to each fragment, each header containing a sequence number, and
    the Point-to-Point Protocol encapsulator adds no sequence numbers to the packets of the delay-sensitive flows.

14. A device as in claim 10, wherein at least two of the link interfaces provide an equal data rate transmission over respective links coupled thereto.

15. A device for reception of load balanced packet transmissions through a bundle of data communication links carrying fragments of packets of best efforts traffic distributed throughout the links and carrying packets of a plurality of delay-sensitive flows, the packets of each delay-sensitive flow traversing a single one of the data communication links, the device comprising:

a plurality of link interfaces, each link interface being coupled for reception of fragments and packets over one data communication link of the bundle;

a decoder coupled to the link interfaces for segregating received fragments of packets of best efforts traffic from received packets of one or more individual delay-sensitive flows;

a fragment reassembler for reordering fragments received over different links as necessary and reassembling fragments into packets for best-efforts service; and a packet router, coupled to receive packets from the fragment reassembler, and coupled to receive packets from delay-sensitive flows carried on a plurality of the data communication links from the decoder without any reordering.

16. A device as in claim 15, further comprising:

a Multilink Protocol de-encapsulator for stripping off Multilink Protocol encapsulation data from the fragments; and a Point-to-Point Protocol de-encapsulator for stripping off Point-to-Point Protocol encapsulation data from the packets of the delay-sensitive flows.

17. A device as in claim 15, wherein at least two of the link interfaces provide an equal data rate reception from respective links coupled thereto.

18. A device as in claim 15, wherein the router comprises an Internet Protocol packet router.

19. An apparatus for load balanced transmission of packets through a bundle of data communication links of a packet communication network, comprising:

means for distinguishing packets for best-efforts service from packets forming a plurality of delay-sensitive flows;

means for fragmenting a plurality of the packets for best-efforts service;

means for evenly transmitting the fragments of each fragmented packet over a plurality of the links of the bundle;

means for calculating a first hash value from predetermined packet header data of each packet of a first one of the delay-sensitive flows and calculating a second hash value from predetermined packet header data of each packet of a second one of the delay-sensitive flows, the second hash value differing from the first hash value;

means for assigning each packet for the first and second delay-sensitive flows to respective first and second ones of the links as a function of the first and second hash values; and link interfaces coupled to the first and second links for transmitting packets of the first and second delay-sensitive flows over the assigned first and second links interleaved together with the fragments transmitted on the first and second links.

20. A computer-readable medium carrying one or more sequences of instructions for load balanced transmission of packets through a bundle of data communication links, wherein execution of the one or more sequences of instructions by one or more processors causes the one or more processors to perform the steps of:

distinguishing packets for best-efforts service from packets forming a plurality of delay-sensitive flows;

fragmenting a plurality of the packets for best-efforts service;

for each fragmented packet, transmitting the fragments over a plurality of the data communication links of the bundle;

for each packet of a first one of the delay-sensitive flows, calculating a first hash value from predetermined packet header data;

for each packet of a second one of the delay-sensitive flows, calculating a second hash value from predetermined packet header data, the second hash value differing from the first hash value;

assigning each packet for the first delay-sensitive flow to a first one of the data communication links as a function of the first hash value;

assigning each packet for the second delay-sensitive flow to a second one of the data communication links as a function of the second hash value; and transmitting packets of the first and second delay-sensitive flows over the assigned first and second data communication links interleaved together with the fragments transmitted on the first and second data communication links.

21. A computer-readable medium as in claim 20, wherein the assigning steps directly identify the first and second data communication links from one or more bits of the first and second hash values.

22. A computer-readable medium as in claim 20, wherein the assigning steps associate the first and second hash values with the first and second data communication links, respectively as a function of usage of the first and second data communication links.

23. A computer-readable medium as in claim 22, wherein the function of usage of the first and second data communication links comprises relative levels of existing assignments to the first and second data communication links.

24. A computer-readable medium as in claim 20, wherein the steps of fragmenting and transmitting of fragments conform to the Multilink Protocol.

25. A computer-readable medium as in claim 24, wherein the step of transmitting packets of the first and second delay-sensitive flows conforms to the Point-to-Point Protocol.

26. A computer-readable medium as in claim 20, further comprising assigning the fragments for transmission over the plurality of data communication links in a round-robin fashion.

27. A computer-readable medium as in claim 20, further comprising adding a sequence number to each of the fragments for transmission.

28. A computer-readable medium as in claim 27, wherein the step of transmitting of the packets of the first and second delay-sensitive flows comprises transmitting packets of the first and second delay-sensitive flows without adding any sequence numbers.

29. The device of claim 15, wherein the packet router is configured to calculate a first hash value from predetermined packet header data for each packet of a first one of the delay-sensitive flows;

calculate a second hash value from predetermined packet header data for each packet of a second one of the delay-sensitive flows, the second hash value differing from the first hash value;

assign each packet for the first delay-sensitive flow to a first one of the data communication links as a function of the first hash value;

assign each packet for the second delay-sensitive flow to a second one of the data communication links as a function of the second hash value; and transmit packets of the first and second delay-sensitive flows over the assigned first and second data communication links interleaved together with the fragments transmitted on the first and second data communication links.

30. A system comprising:

a device for reception of load balanced packet transmissions through a bundle of data communication links carrying fragments of packets of best efforts traffic distributed throughout the links and carrying packets of a plurality of delay-sensitive flows, the packets of each delay-sensitive flow traversing a single one of the data communication links, the device including at least a plurality of link interfaces, each link interface being coupled for reception of fragments and packets over one data communication link of the bundle;

a decoder coupled to the link interfaces for segregating received fragments of packets of best efforts traffic from received packets of one or more individual delay-sensitive flows;

a fragment reassembler for reordering fragments received over different links as necessary and reassembling fragments into packets for best-efforts service; and a packet router, coupled to receive packets from the fragment reassembler, and coupled to receive packets from delay-sensitive flows carried on a plurality of the data communication links from the decoder without any reordering.

31. A system comprising:

a set of components that is configured to perform segregating received fragments of packets of best efforts traffic from received packets of one or more individual delay-sensitive flows;

multilink processing for delay sensitive flows; and per-flow load balancing for best efforts traffic.

32. A method comprising:

segregating received fragments of packets of best efforts traffic from received packets of one or more individual delay-sensitive flows;

performing multilink processing for the delay-sensitive flows; and performing per-flow load balancing for the best efforts traffic.

* * * * *